(12) United States Patent
Petersen et al.

(10) Patent No.: US 6,408,361 B1
(45) Date of Patent: Jun. 18, 2002

(54) AUTONOMOUS WAY SPECIFIC TAG UPDATE

(75) Inventors: Thomas Albert Petersen; James Nolan Hardage, Jr.; Scott Ives Remington, all of Austin, TX (US)

(73) Assignees: International Business Machines Corporation, Armonk, NY (US); Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/389,446

(22) Filed: Sep. 2, 1999

(51) Int. Cl.[7] .............................................. G06F 12/00
(52) U.S. Cl. ..................... 711/129; 711/144; 711/156
(58) Field of Search ................................ 711/156, 168, 711/129, 133, 144

(56) References Cited

U.S. PATENT DOCUMENTS 5,802,586 A * 9/1998 Jones et al. .................. 711/155

OTHER PUBLICATIONS

Messmer, Hans–Peter. *The Indispensable P.C. Hardware Book: Your Hardware Questions Answered.* (Second Edition) Addison–Wesley. New York, 1995, pp. 211–226.

Kozierok, Charles M. "Function and Operation of the System Cache," *P.C. Guide.* http://www.pcguide.com/ref/mbsys/cache/func–c.html, Dec. 16, 1998 vers., pp. 1–3.

Kozierok, Charles M. "Layers of Cache," *P.C. Guide.* http://www.pcguide.com/ref/mbsys/cache/layers–c.html, Dec. 16, 1998 vers., pp. 1–3.

* cited by examiner

*Primary Examiner*—Jack A. Lane
(74) *Attorney, Agent, or Firm*—Anthony V England; Robert M Carwell

(57) ABSTRACT

The present invention provides a method and apparatus for allowing autonomous, way specific tag updates. More specifically, the invention provides way specific tag and status updates while concurrently allowing reads of the ways not currently being updated. If a read hit is determined, then the read is processed in a typical fashion. However, if the read is a read miss and one of the ways is flagged as being updated, then all ways are read again once the specific way has completed its updated.

16 Claims, 6 Drawing Sheets

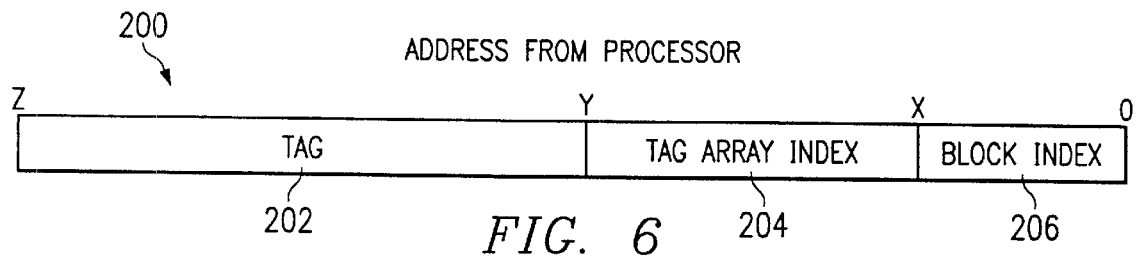
FIG. 6
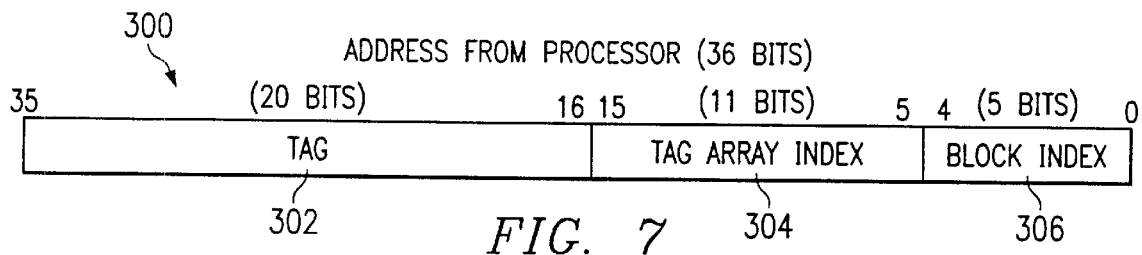
FIG. 7
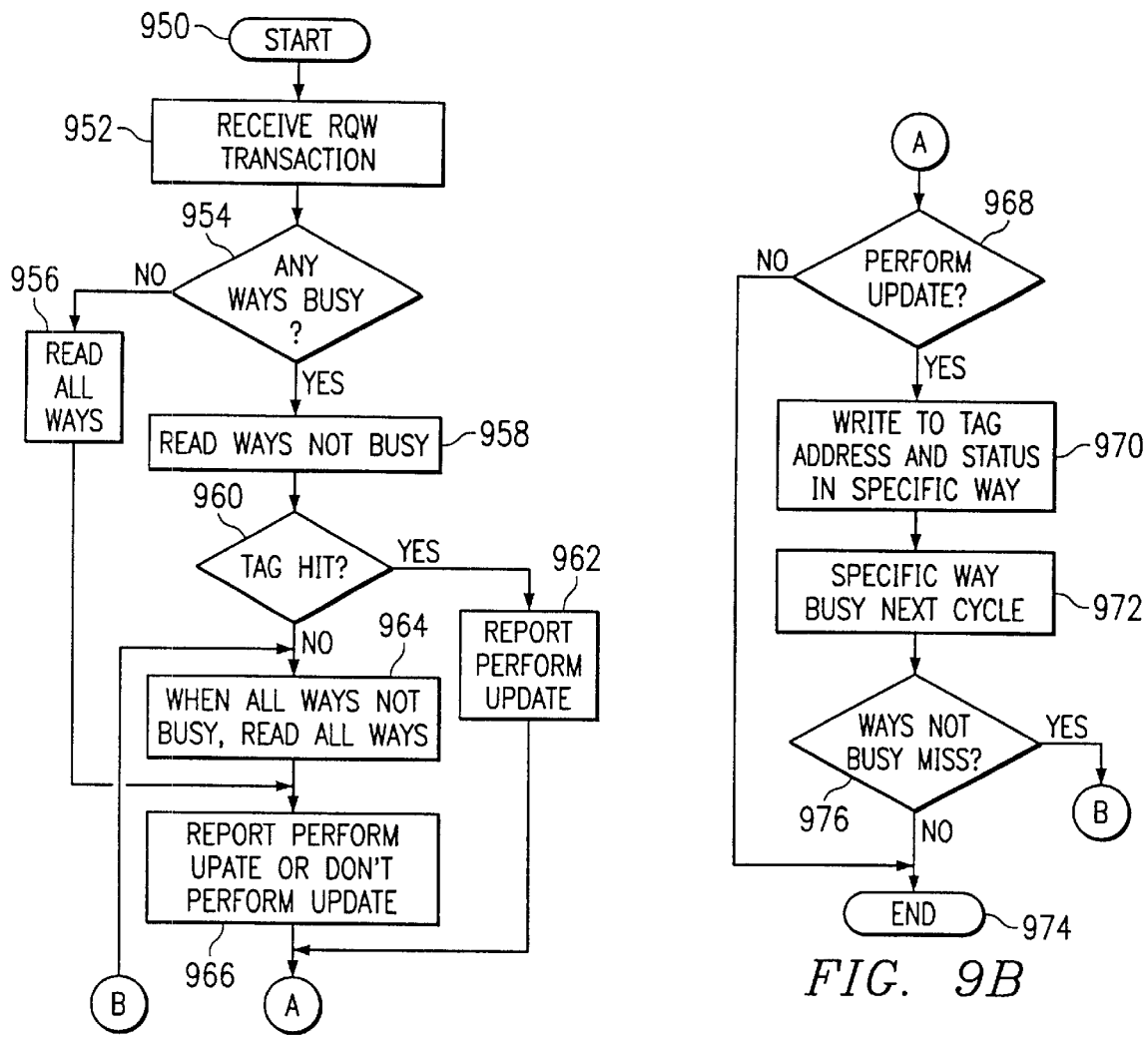
FIG. 9A
FIG. 9B

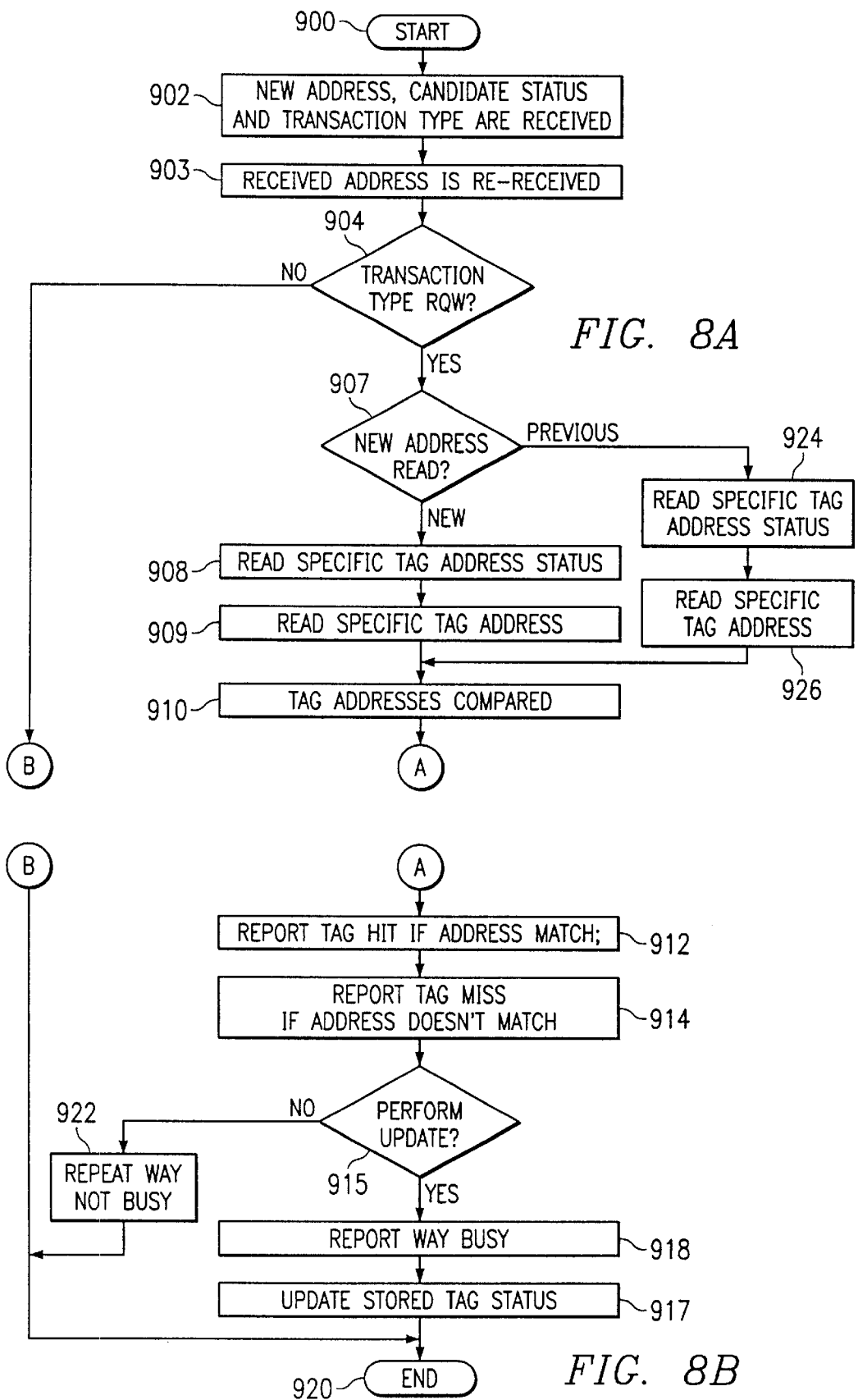

AUTONOMOUS WAY SPECIFIC TAG UPDATE

FIELD OF THE INVENTION

The disclosed invention relates to autonomous, way specific tag updates. Autonomous, way specific tag updates are achieved by allowing a concurrent read of non-utilized ways during the specific update of a single way.

BACKGROUND

As technology in the computer industry advances, the speed of which information is processed and accessed is increased. One advance is the use of a cache system. The cache system includes a cache controller and a cache memory. Levels of cache memory differ according to their proximity to the processor. For instance, a cache memory resident on the chip with the processor is generally referred to as a level 1 (L1) or level 2 (L2) cache. A cache memory that is resident off of the processor chip is typically referred to as a level 3 (L3) cache, however, the cache directory portion of the L3 cache memory may reside on the microprocessor chip. The cache memories typically store a subset of what is stored in larger main memory. However, the access speeds for the small cache memories are very high, thus allowing a very short access time.

A cache memory stores frequently accessed main memory data. Thus, the processor accesses the faster speed cache memory to retrieve information without accessing the slower main memory. The most frequently addressed data is held in the cache memory. The cache controller intercepts memory requests then determines if the cache memory contains the data that was requested by the processor. If that information is stored in the cache memory, then the request is redirected from main memory to the cache memory. Because of the small size of the cache memory, the cache memory must be continuously updated with recently requested information. In a typical transaction, the main memory address is compared with the stored addresses in the cache directory of the cache memory to determine if the data resident at that address is stored in the cache memory. If that information is stored in the cache memory, then the information is sent from the cache memory at a relatively fast rate. However, if the information is not resident in the cache memory, then the information is obtained and delivered to the processor from main memory. The information coming back from main memory is also stored in the cache memory as this data was recently requested. While this information is being written to the cache memory, the cache memory cannot be read to determine if the next memory address request is resident in the cache memory. Even the faster access cache memories are limited to serial read and write transactions so that they can maintain data coherence.

Information stored in the cache memory may also contain a status. The status of the cache memory entry can be identified by the MESI Protocol (modified, exclusive, shared, invalid). Thus, certain transactions may not modify the data stored in the cache memory, but they may change or modify the status of that specific cache memory entry. While a status is being modified or updated, no reads can be performed; thus, status updates are serial.

Therefore, any advancement in the ability to increase the number of reads and writes to cache memory during a given clock period would be beneficial.

THE SUMMARY OF THE INVENTION

The present invention provides a method and apparatus for allowing autonomous, way specific tag status updates. More specifically, the invention provides way specific tag updates while concurrently allowing reads of the ways not currently being updated. If a read hit is determined, then the read is processed in a typical fashion. However, if a read miss is determined and a way update is flagged, then all ways are read after the specific way has been updated.

BRIEF DESCRIPTION OF DRAWINGS

A better understanding of the present invention can be obtained when the following detailed descriptions of the exemplary embodiments are considered in conjunction with the following drawings in which

FIG. 6 is a block diagram representing a memory address partitioning in accordance with the disclosed invention;

FIG. 7 is a block diagram representing an exemplary memory address request in accordance with the disclosed invention;

FIGS. 8a–8b are flowcharts depicting a way specific read/write process according to the disclosed invention;

FIGS. 9a–9b are flowcharts depicting an autonomous, way update process according to the disclosed invention.

DETAILED DESCRIPTION OF EXEMPLARY EMBODIMENTS

Figure 1:
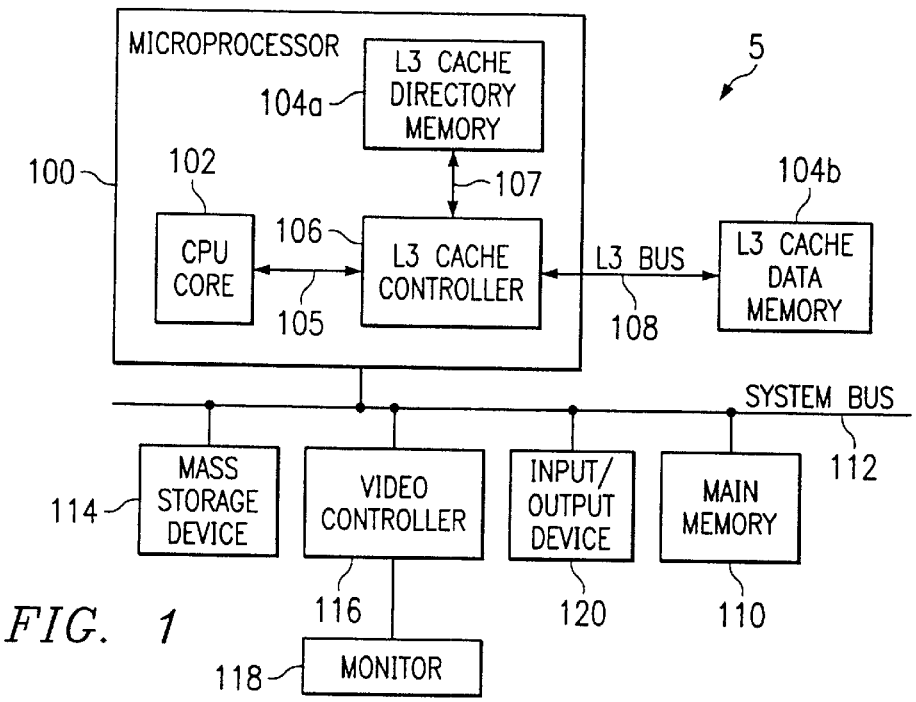
FIG. 1 is a block diagram of a computer system in accordance with the disclosed inventions.

In the description which follows, like parts are marked throughout the specification and drawings with the same reference numerals, respectively. The drawing figures are not necessarily drawn to scale and certain figures may be shown in exaggerated or generalized form in the interest of clarity and conciseness.

A computer system according the disclosed invention is shown in FIG. 1. Microprocessor 100 includes a CPU core 102, an L3 cache directory memory 104a, and an L3 cache controller 106. The CPU core 102 is connected to the L3 cache controller 106 through internal bus 105. The L3 cache directory memory 104a is connected to the L3 cache controller 106 through a second internal bus 107. The L3 cache directory memory 104a, the L3 cache controller 106, and the L3 cache data memory 104b comprise the L3 cache system. The L3 cache data memory 104b is connected to the microprocessor 100, and specifically the L3 cache controller 106, through an external L3 bus 108.

The microprocessor 100 is connected to a system bus 112. A mass storage device 114, a video controller 116, a main memory 110, and an input output device 120 are also connected to bus 112. The video controller 116 is connected to a monitor 118. The mass storage device 114, in the disclosed embodiment, is a hard disk drive. However, a wide variety of mass storage devices can be used without detracting from the spirit of the invention. Other examples of mass storage devices are tape disk drives and compact disk drives. The input output device 120, in the disclosed embodiment, is a keyboard and/or a mouse and or printer or modem. The video controller and monitor are common elements of a computer system and are therefore well known in the art.

Figure 2:
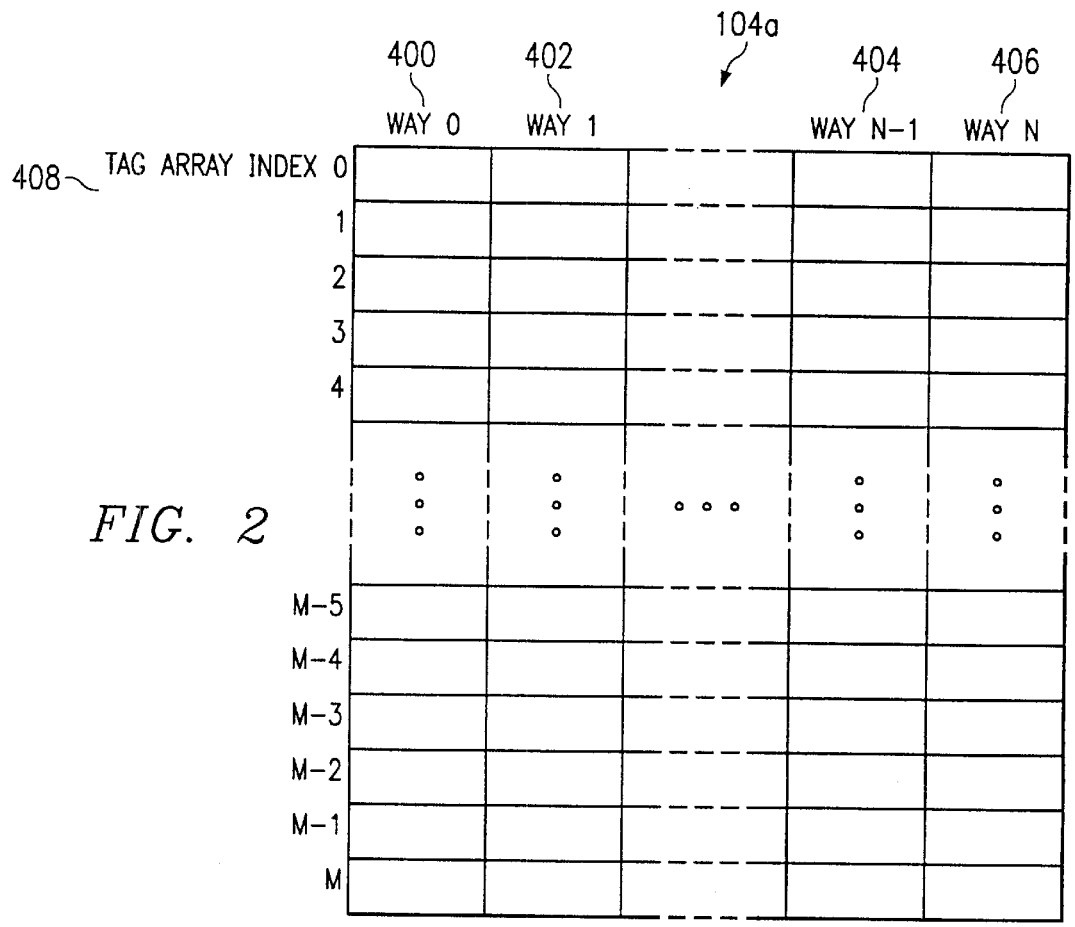
FIG. 2 is a block diagram representing way partitioning of a cache directory memory.

Memory address partitioning is implemented when the cache directory memory 104*a* is partitioned into a series of ways. FIG. 2 shows the cache directory memory 104*a* partitioned into N+1 "ways." A way is a grouping of memory locations that can be addressed by a tag array index. The cache directory memory 104*a* is partitioned into N+1 ways, way 0 400 through way N 406. The cache directory memory 104*a* also includes M+1 tag array indexes 408, tag array index 0 through tag array index M. Way 0 400, way 1 402, way N−1 404, and way N 406 are shown. Each way has corresponding tag array indexes 408. A tag array index identifies a specific location in each way. For example, tag array index 4 identifies row 4 in ways 0 400 through way N 406. If a specific tag array index is identified, such as tag array index M−3, then the transaction address is compared with the entries in all ways, ways 0 400 through way N 406. If a match or read hit occurs, then the tag array index and specific way identify the location of the data in the cache data memory.

Figure 3:
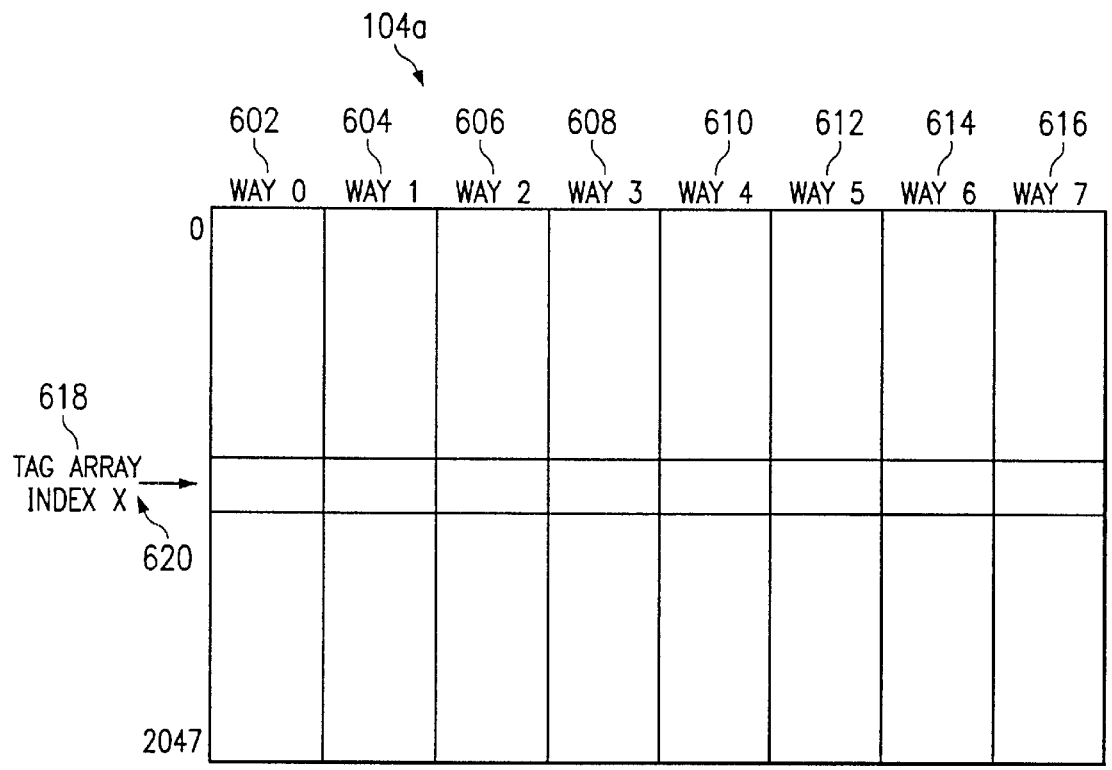
FIG. 3 is a block diagram of an exemplary partitioning of a cache directory memory containing a specific tag array index according to the disclosed invention.

In FIG. 3, the way partitioning of the cache directory memory 104*a* of an exemplary embodiment is shown. The cache directory memory 104*a* is shown partitioned into eight ways. Way 0 602, way 1 604, way 2 606, way 3 608, way 4 610, way 5 612, way 6 614, and way 7 616 are shown. The number of tag array indexes 618 is 2048. For a specific tag array index X 620, the tag array index X 620 is shown across all eight ways. Thus, the incoming tag would be compared against the tags contained in the tag array indexes 618 of way 0 602 through way 7 616. The eight comparisons are made in parallel in order to determine if a tag hit for the specific tag array index X 620 is met.

When the processor communicates with the cache memory, it does so through a series of transactions. All transactions can be categorized as either requiring a status update or not requiring a status update. One approach supporting a status update is a read/qualified/write transaction. A read/qualify/write transaction can occur, for example, when two or more different processors are connected to the same cache and both request access to the same data. In the case of a read/qualify/write transaction, the cache must check a status that is stored with the tag. If the status is not set appropriately, the write or update portion of the transaction should not be completed. The specifics of the location of the status in the tag address are discussed later.

Figure 4A:
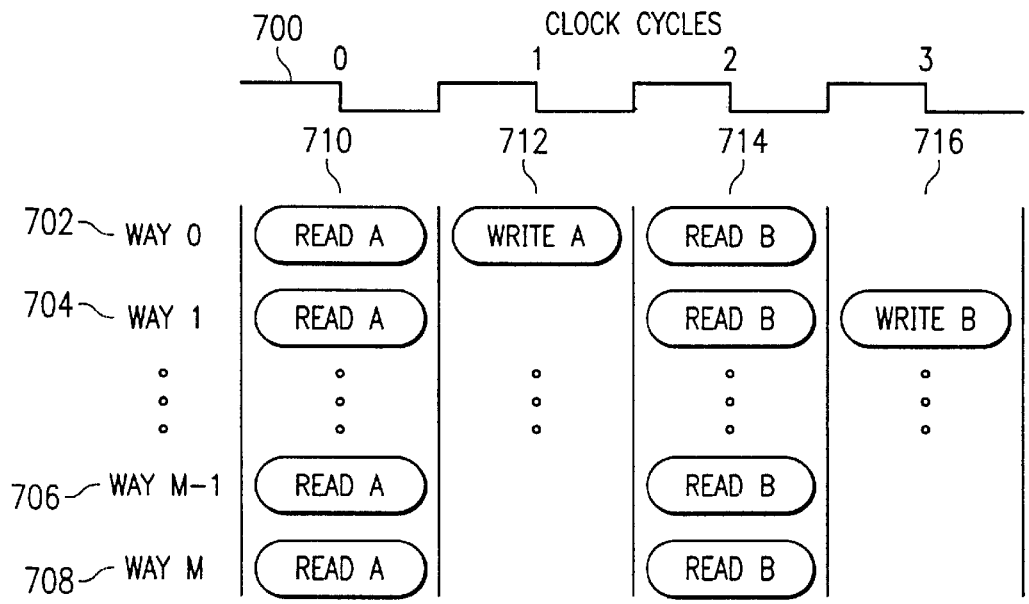
FIG. 4a is a timing diagram of a read and write of a single ported cache directory memory as disclosed in the prior art.

In FIG. 4*a*, two prior art read and write transactions are shown (transaction "A" and transaction "B") in relation to the clock cycles needed to carry them out for a single ported cache memory. Clock signal 700 is shown for four clock cycles, clock cycle 0 710 through clock cycle 3 716. Way 0 702, way 1 704, way M−1 706 and way M 708 are also shown. Each way is read during clock cycle 0 710 in read transaction "A." Thus, way 0 702, way 1 704, way M−1 706 and way M 708 show "read A". If there is a hit in any way, a write follows the read for that specific way in the next clock cycle. Thus, if way 0 702 has a hit in clock cycle 0 710, then way 0 702 is written to in clock cycle 1 712 shown as "Write A". During the write transaction, M ways are idle. Thus, way 1 704 through way M 708 have no action. Next in clock cycle 2 714, a second read transaction "B" is processed. Thus, way 0 702 through way M 708 show "Read B." If way 1 704 has a hit in clock cycle 2 714, then in clock cycle 3716, way 1 704 is specifically written to during this clock cycle. This is shown as "Write B." Way 0 702, and way 2 through way M 708 are shown as idle during the write transaction. Therefore, the prior art requires that when one way is being written, the remaining ways remain inactive until the write is completed for a single ported cache memory. Only when the write is complete can the next read transaction be processed.

Figure 4B:
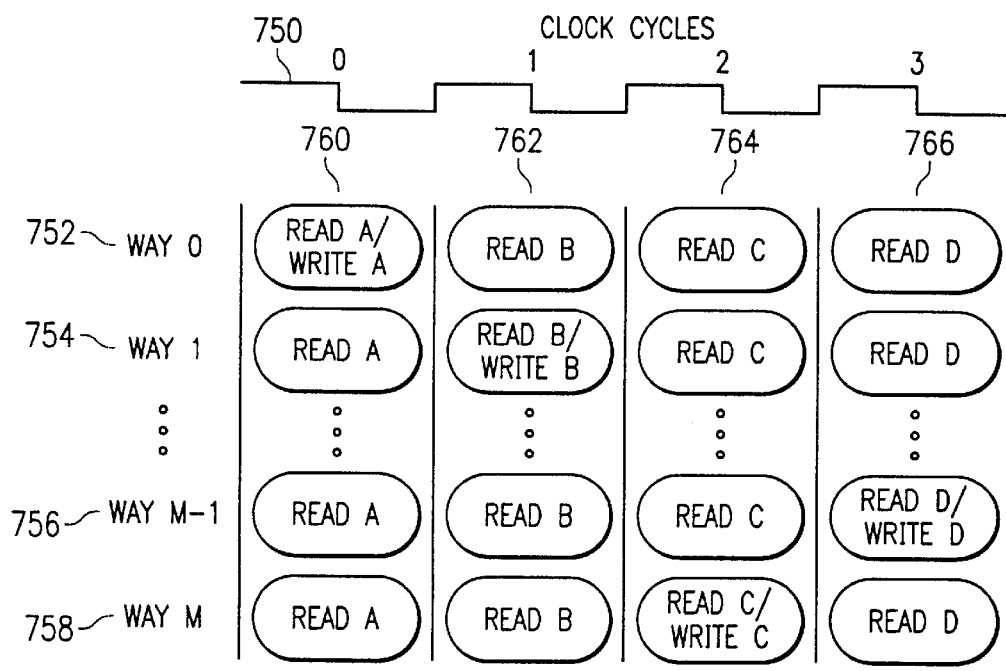
FIG. 4b is a timing diagram of a read/qualify/write of a dual ported cache directory memory as disclosed in the prior art.

In FIG. 4*b*, four prior art read/qualify/write transactions are shown (transactions "A," "B," "C," and "D," in relation to the clock cycles to carry them out for a dual ported cache memory.) Clock signal 750 is shown for four clock cycles, clock cycle 0 760, clock cycle 1 762, clock cycle 2 764, and clock cycle 3 766. Way 0 752, way 1 754, way M−1 756 and way M 758 are also shown. Each way is read during clock cycle 0 760 in the read/qualify/write transaction "A." Thus, way 0 752, way 1 754, way M−1 756 and way M 758 show "Read A." If there is a hit in any way, a write follows the read for that specific way during the clock cycle 0 760. Thus, if way 0 752 has a hit in clock cycle 0 760, then way 0 752 is written to in clock cycle 0 760 and is shown as "Write A." Thus, a "Read A" is performed in each way during clock cycle 0 760 and an additional "Write A" is performed in way 0 752 for clock cycle 0 760 in the dual ported cache memory. Next, in clock cycle 1 762, all ways, way 0 752 through way M 758 show "Read B." If way 1 754 has a hit, then during clock cycle 1 762 a "Write B" is shown in way 1 754. Therefore, each way is read during clock cycle 1 762 and additionally a "Write B" is performed in way 1 754 during the same clock cycle 1 762. The remaining clock cycles, clock cycle 2 764 and clock cycle 3 766 are shown duplicating similar read/qualify/write transaction as was discussed for clock cycles 0 760 and clock cycle 1 762. Therefore, the prior art read/qualify/write transaction, when implemented with a dual ported ache memory, allows that a read and write be performed to a specific way during a single lock cycle. Thus, a read/qualify/write transaction is performed during each clock cycle as shown. To accomplish these tasks in a single clock cycle, the dual ported cache memory is approximately twice the size of a single ported cache memory and requires more power to operate. Thus, a price in size and power is paid to increase the speed of the transaction.

Figure 5:
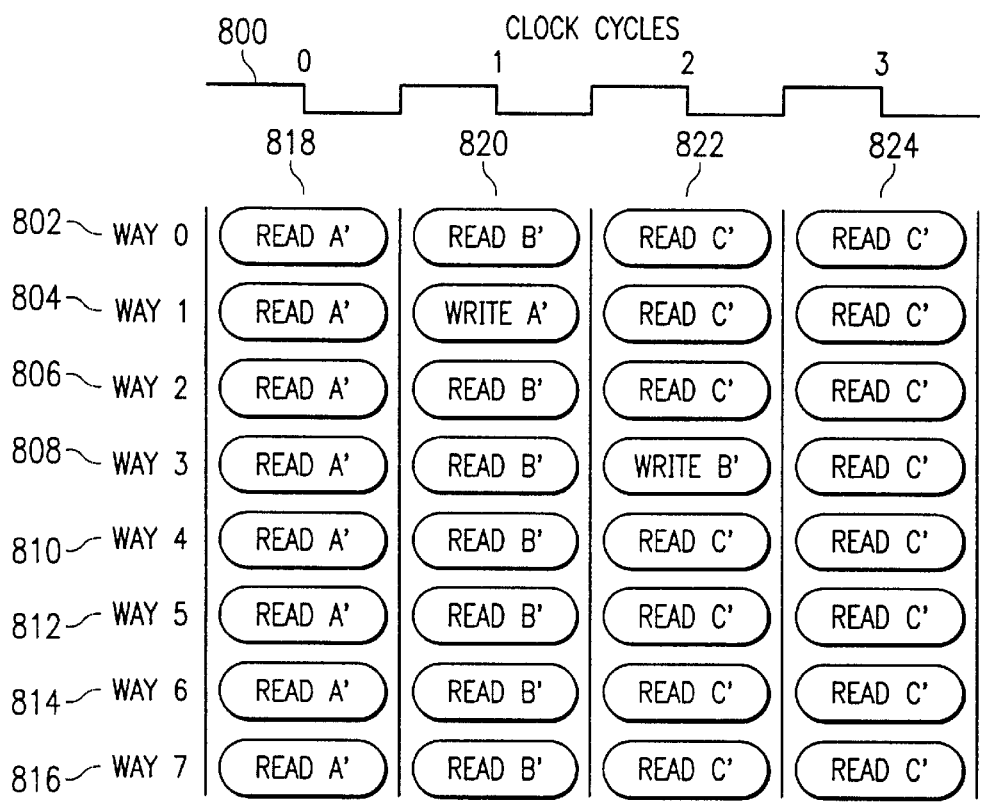
FIG. 5 is a timing diagram depicting a read/qualify/write of a cache directory memory in accordance with the disclosed invention.

In FIG. 5 three read/qualify/write transactions A', B', and C' are shown including a timing diagram, according to the disclosed invention. According to one exemplary embodiment, a single ported cache memory is implemented; however, the functionality of a dual ported cache memory is approached. Thus, according to the disclosed invention, a single ported cache memory which is approximately one-half the size of a dual ported cache memory can be implemented to allow for the functionality of the dual ported cache memory while occupying the space associated with a single ported cache memory. The functionality of the disclosed invention is shown as follows.

Clock signal 800 is shown for four cycles, clock cycle 0 818, clock cycle 1 820, clock cycle 2 822, clock cycle 3 824. Way 0 802, way 1 804 way 2 806, way 3 808, way 4 810, way 5 812, way 6 814 and way 7 816 are also shown. When a read/qualify/write transaction is received in clock cycle 0 818, all ways are read simultaneously to determine the stored tag and the status of each tag in the specific tag array index. If a write must be performed to a specific way, then that way is written to in clock cycle 1 820. However, according to the invention, the remaining ways are read with the next transaction B'. In this example, way 1 804 is written to and is shown as "Write A'" while, way 0 802, and ways 2 806 through way 7 816 are read and are shown as "Read B'". If a hit or match is produced by the "Read B'", then the specific way hat must be updated is written to in clock cycle 2 822. While the "write B'" is being completed for way 3 808 in clock cycle 2 822, the next transaction, "Read C'" is processed by the remaining ways. However, if a miss, or no match is encountered when the remaining ways are read, as is the case during clock cycle 2 822, then all ways are re-read after the "Write B'" update is complete to determine if the specific way being updated during the previous clock cycle contains the information sought. FIG. 5 shows that in clock cycle 3 824, all ways are read and this is shown as "Read C'" even though seven of the eight ways previously encountered a miss. Way 0 802 through way 2 806 and way 4 810 through way 7 816 are re-read for C' while way 3 808 is read for the first time. The result is that a clock cycle can be saved in a majority of cases because a read and a write are performed during the same clock cycle without waiting until the write is completed.

FIG. 6 shows a diagram of a typical memory address signal. The address signal 200 is comprised of a tag portion 202, a tag array index 204, and a block index 206. The block index 206 defines the smallest piece of data that can be selected and is commonly referred to as a "line." The size of the cache line and the size of the block index, typically, are equivalent. Therefore, a block is referred to as the smallest piece of data sent to and from the cache. The tag array index 204, also commonly referred to as a set, defines a series of addresses that are used to identify a range of possible addresses.

The tag portion 202 is the portion of the address that is used to select a particular way within a set, if one of the many ways contains this tag address. Thus, the tag portion 202 is used to identify the specific memory address within a given tag array index 204. In certain transactions, additional information besides the address is supplied by the processor. For instance, a status field may be appended to the address. The candidate tag status, stored tag status, and read/qualify/write status can be one of the following: 1) Modified, 2) Exclusive, 3) Shared, and 4) Invalid. These statuses are commonly referred to as the MESI (pronounced "messy") status and are well known in the art. The various comparisons of the status fields allow the processor to determine whether the processor can update the status and/or the associated data.

Another example of appended information is the transaction type. This information allows the processor to perform various logical functions dependent on which type of transaction is presented.

The tag array index 204 can vary in size. By increasing the size of the tag array index 204, more addresses can be stored in the cache directory 104a entry. A typical formula used to calculate the sizes of the memory, sets, and ways is that the memory capacity equals the number of ways, multiplied by the number of sets, multiplied by the cache line size or block index size. As an equation:

memory size=ways*sets*block index.

Therefore, for a given memory size, as the tag array index is increased, given a standard block index size, the number of ways are decreased.

FIG. 7 shows the memory address signal of one exemplary embodiment. A memory address signal 300 includes a block index 306, a tag array index 304, and a tag 302. The block index, in this exemplary embodiment, is five bits wide. Thus, the block index 306 identified by one of thirty-two encodings identifies one of thirty-two bytes within a block. The tag array index 304 is 11 bits wide. This allows for 2048 tag array indexes or sets. The tag 302 is 20 its wide and is used to identify the specific memory address within the set identified by the tag array index 304. Thus, using the equation stated above, if the memory size for the exemplary embodiment is 512 K, the tag array index is 2048, and the block index is 32, then the cache directory memory 104a is partitioned into 8 ways.

512 K=2048(sets)*8(ways)*32(block size)

Figure 10:
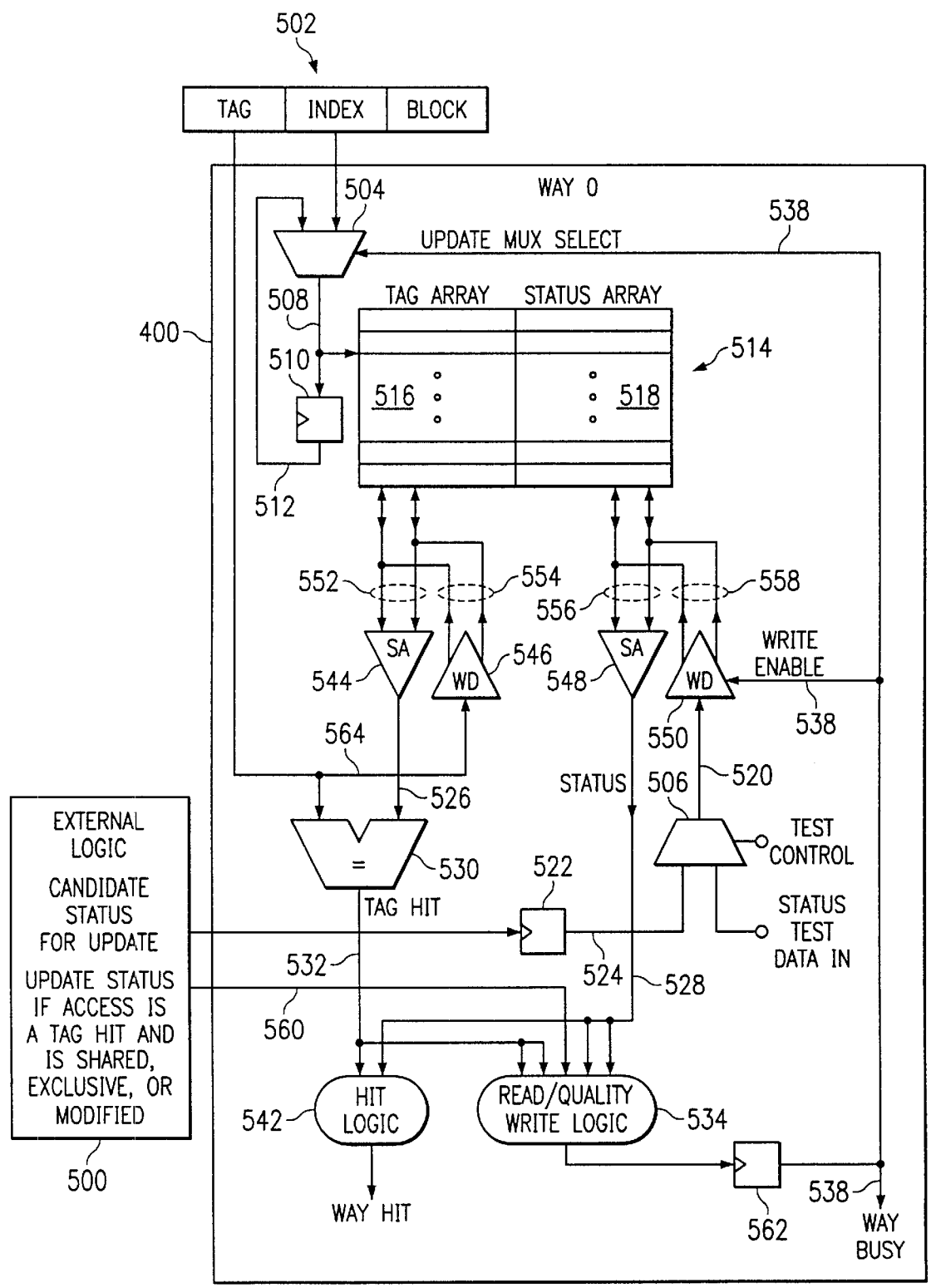
FIG. 10 is a block diagram depicting a way specific processing of an incoming transaction.

In order to carry out the examination and storage of various transactions, the cache controller 106 implements logical functions. A flow chart of these functions is shown in FIGS. 8a–8b. The cache controller logic described here is duplicated and processed in parallel for each way present in the cache directory memory 104a. The process starts at step 900. In step 902, a new address, candidate status, and transaction type are received by the cache controller from the CPU core 102. The address is the tag address 302 combined with the tag array index 304. The previous address is re-received in step 903. As shown in FIG. 10 and will be more fully described later, latches 510 and 522 are used to store the previous address and previous candidate status if they are needed for an update in the next cycle, sending them on to muxes 504 and 506. The result is that the current transaction and the previous transaction are supplied to the mux 504 and the previous transaction is supplied to mux 506 simultaneously. Returning to FIG. 8a, at step 904, the transaction is examined to determine if it is a read/qualify/write transaction. If the transaction is not a read/qualify/write transaction, the process ends in step 920. In step 907, whether the read/qualify/write logic 534, as shown and described in detail in FIG. 10, which controls muxes 504 and 506 selects either the new addresses or writes to the previous address with the previous candidate status is determined. This selection is determined based upon whether that way hit. If the new address is selected, the stored tag address status, identified by the received tag array index 304, is read for this specific way in step 908. Concurrently the stored tag address, identified by the received tag array index 304, is read in step 909. The stored tag address and stored tag address status are identified by the tag array index 304, which in one embodiment, identifies one of 2048 tag addresses and tag address statuses. If the previous address and previous candidate status are selected, the stored status is modified to its proper value determined by the read/qualify/write logic. The proper value is the value contained in the candidate status latch 522.

In step 910, the tag address of the transaction is compared with the tag address stored in the L3 subarray. If the tag address matches the tag address of the transaction, then a tag hit is reported in step 912 and a status update is determined by the read/qualify/write logic 534. If the tag address does not match the tag address of the transaction received, then a tag miss is reported in step 914. Next, in step 915, whether to perform the update is determined. During a read/qualify/write transaction, stored tag status may be updated with the candidate tag status. Therefore, if the received tag address and the stored tag address match, and if the stored tag status matches the qualifications from external logic 500, then an update is performed. If either a tag miss is encountered, or the stored status does not meet the qualifications from external logic 500, then a way not busy is reported for this specific way in step 922 and the process ends with step 920. The preceding steps are completed in a single clock cycle, for example, clock cycle 0 818 of FIG. 5. Thus, if a tag miss is reported or the stored status does not meet the qualifications from external logic 500, then this specific way is prepared to perform another transaction at the next clock cycle. Once this process is completed for the specific way, the process is repeated in a continuous loop.

If the update is to be performed, the busy signal is reported busy when the status is being updated in step 918. Next, in step 917, the stored tag status is updated with the candidate status of the transaction. Typically, a read/qualify/write transaction is requested to update the status of a stored tag status. The process ends in 920. The steps necessary to update the stored tag address status are completed during one clock cycle. Thus, if a transaction produces a tag miss (which includes a tag hit with a stored status of invalid) then the process completes in one clock cycle for this specific way. If a transaction produces a tag hit (which includes a tag hit and a stored status not being invalid) and the stored status meets the qualifications from external logic 500 as determined by Read/Qualify Write Logic 534, the process requires two clock cycles to complete. Thus, the process for a specific way can be completed in one or two clock cycles, dependant upon whether an update to the specific way is required. Thus, the functionality of a dual-ported cache memory is approached through the use of a single ported cache-memory.

The proceeding process is repeated multiple times for each way in consecutive clock cycles. For example, for way 1 in FIG. 5, a new address, candidate status, and transaction type are received in step 902. For this example, the transaction type is a read/qualify/write transaction type. The specific tag address and specific tag address status are read, where the specific tag array index is identified through the received address. The stored tag address is compared with the received tag address in step 910. In this example, the tag addresses match and therefore, a tag hit is reported in step 912. When a tag hit is reported and the stored tag address meets the qualifications specification by external logic 500, an update is necessary as determined in step 915. These steps are performed during the first clock cycle 0 818 and are designated on FIG. 5 as a "Read A'" in way 1 804, clock cycle 0 818. In the next clock cycle, clock cycle 1 820, which begins with updating the stored tag address status in step 917, way 1 804 is represented as a "Write A'". During this clock cycle, the stored status is updated with the candidate status in step 917. Storing the tag address status uses the entire clock cycle, clock cycle 1 820.

At the beginning of the next clock cycle, clock cycle 2 822, another new address, candidate status and transaction type are received. Again, this transaction is a read/qualify/write, so the specific tag address is read from the stored tag address. The stored tag address is compared with the new received tag address. In this example, the tag addresses do not match and, therefore, a tag miss is reported in step 914. Thus, no update is performed and the process ends in step 920. The steps from receiving this new address, candidate status, and transaction type through the decision to not update the stored address status is completed during clock cycle 2 822. This is shown as "Read C'" in way 1 804, clock cycle 2 822 in FIG. 5.

In the next clock cycle, clock cycle 3 824, another new address, candidate status and transaction type are received and the previous address is re-received through the latch cycle described in FIG. 10. The previous address is re-received during each implementation of this process. The candidate status is latched such that the candidate status at the mux 506 is associated with the previous address. Therefore, the current candidate status is not used until one clock cycle has passed. In step 907, the read/qualify/write logic 534, determines if the stored tag status should be updated for the re-received address. Way 1 804 is directed by the read/qualify/write logic 534 to process the previous address. This is determined in step 907. Next, the previous tag address index directs the way, way 1 804, to read the stored values at this tag array index. The tag addresses are again compared in step 910 and a tag miss is reported in step 914. No update is necessary as determined in step 915, and the process ends in step 920. These steps are accomplished during clock cycle 3 824 and are represented in FIG. 5 as a "Read C'" for way 1 804, clock cycle 3 824.

As can be seen, the process, beginning with start 900 and ending with end 920, can be completed in one clock cycle or two clock cycles, depending upon whether an update is necessary. In one disclosed embodiment, for a specific way, way 1 804, the process is completed from start to whether an update is necessary in the first clock cycle 0 818 by determining a hit. Then, in clock cycle 1 820, the stored tag status is updated with the candidate status. In clock cycle 2 822, the process begins again with start 900 and is implemented through the end 920. The process was completed because no update was necessary for way 1 804 during this clock cycle. The same address and candidate status were re-processed in clock cycle 3 824, providing the same outcome for way 1 804. The same address and candidate status were re-processed during the clock cycle because all ways read during clock cycle 2 822 reported tag misses. Since way 3 808, during clock cycle 2 822, was performing a write, the read process for all ways must be completed again. This is discussed in detail in FIG. 9a–9b. Thus, as can be seen, the process is a dynamic function and allows for variations in the time necessary to complete the function as described in the disclosed invention. In the prior art, this process would require a dual ported cache memory to implement the process from start 900 to end 920. However, in the disclosed embodiment, only a single ported cache memory is necessary to complete this process, thus allowing for optimization of the cache directory memory 104a.

FIGS. 9a and 9b show the process of determining whether a read miss has occurred while a way is being updated, thus requiring a second read of all ways for the same transaction. The process starts with step 950. In step 952, a read/qualify/write transaction is received. Whether any ways are busy are determined in step 954. The way busy signal for each way is monitored to determine if any way is busy. If no ways are busy, then the read portion of the read/qualify/write transaction is processed for all ways in step 956 before proceeding to step 966. If a way is busy in step 954, then the ways not busy are read in step 958. Next in step 960, whether a tag hit and status match have occurred is determined. If a tag hit and status match have occurred, then a perform update is reported in step 962. If a tag hit and status match has not been reported in step 960, all ways are read when all ways are not busy in step 964. In one embodiment, all the ways are re-read in the next clock cycle. Therefore, when the way that was being updated with a write during that clock cycle has completed, then all ways are read during the next clock cycle. Once all ways have been read, a "perform update" or "don't perform update" signal is reported in step 966. Next in step 968, in FIG. 9B, whether a perform update was reported is determined. If a "don't perform update" signal is reported, then the process ends with step 974. The read portion of the process is completed during one clock cycle.

However, if a "perform update" signal is reported, then the candidate status is written to that specific way in step 970. The way busy signal is set to way busy for that specific way in step 972. The update of the stored tag address status is completed during one clock cycle. Therefore, if a way is read and a tag hit is determined, this occurs during one clock cycle. During the following clock cycle, the specific way is updated. Next, in step 976, whether a tag miss was determined for the read of the ways not busy, as shown in step 958, is determined. If a tag miss occurred, then the process proceeds to step 964 where all ways are read. If a tag miss has not occurred, then the process ends with step 974. While the specific way is being written to in step 970, the next transaction is processed beginning with step 952. Thus, all other ways can be read for the second transaction in step 958 while the specific way is being written to for the first transaction in step 970.

In one embodiment, the output as shown in FIG. 5 for ways 0 802 through 7 816 is produced by the disclosed invention. As an example, the process discussing FIGS. 9a–9b as implemented to provide the output as shown in FIG. 5 is provided. For clock cycle 0 818, a read/qualify/write transaction is received. If no ways are busy, as is the case for clock cycle 0 818, then all ways are read in step 956. Then, whether to perform an update on a specific way is reported in step 966. These steps are completed during clock cycle 0 818 and are represented in FIG. 5 as "Read A'" for ways 0 802 through 7 816. In this example, an update must be performed for a specific way, way 1 804. Way 1 804 is updated during clock cycle 1 820. Therefore, in step 970, the stored tag address status is updated in way 1 804, this updating process using the entire clock cycle, clock cycle 1 820 and is represented as "Write A'" for way 1 804, clock cycle 1 820. However, the remaining ways, way 0 802 and ways 2 806 through 7 816 missed, so the process ended with step 974 at the end of clock cycle 0 818. At the beginning of clock cycle 1 820, a next read/qualify/write transaction is received by all ways in parallel. When a way is determined busy, way 1 804 is busy updating the stored tag address status, the read is performed only on the ways not busy, which are way 0 802 and ways 2 806 through 7 816 in step 958. If there is a tag hit, as is the case in this example, then a perform update is reported and the perform update is determined for the specific way. This is accomplished during clock cycle 1 820 and is represented as "Read B'" for ways 0 802 and 2 806 through 7 816, clock cycle 1 820. Also during clock cycle 1 820, the update of way 1 804 is completed. Therefore, during clock cycle 1, ways 0 802, 2 806, through 7 816 have completed their reads, while way 1 804 performed an update. The process has ended for these ways in step 974 for this clock cycle.

Way 3 808 is updated in clock cycle 2 822 and is represented as "Write B'". However, ways 0 802 through 2 806 and ways 4 810 through 7 816 are ready to receive the next read/qualify/write transaction. In clock cycle 2 822, ways 0 802 through 2 806 and ways 4 810 through 7 816 are read. The reading of the ways 0 802 through 2 806 and ways 4 810 through 7 816 are represented as "Read C'" in clock cycle 2 822. During clock cycle 2 822, no tag hit is determined in step 960. Therefore, in step 964, the process holds until all ways are not busy. Therefore, once way 3 808 completes the update of the stored tag address status in clock cycle 2 822, then all ways can be read. Therefore, in clock cycle 3 824, all ways are read and this is represented as "Read C'" in FIG. 5 for clock cycle 3 824. Ways 0 802 through 2 806 and ways 4 810 through 7 816 are re-read and way 3 808 is read during clock cycle 3, ensuring that the entry was not present in way 3 808. Thus, as can be seen, the ways which were dormant during a write cycle in the prior art are read with the next transaction. If a tag hit is received, then a new transaction is read in the following clock cycle and the specific way that provided the tag hit is written to during that clock cycle. However, if a tag miss is encountered when all ways are not read, then the following clock cycle requires that all ways be reread to verify that the tag address being sought was not contained in the way that was busy.

FIG. 10 shows a functional logic diagram which performs the steps shown in FIGS. 8a–8b. The diagram depicts way 0 400; however, the logic shown by this diagram is duplicated for each way in the cache directory memory 104a. The candidate status is provided by the external logic 500. The candidate status is one of the MESI statuses. The received address 502 is provided and contains the tag address, the tag address index, and the block index. The tag address index is sent to an address mux 504. The candidate status is sent though a latch 522 through line 524 to a status mux 506. A second tag address index is provided as the second input 512 to the address index mux 504. The second input 512 is the previous tag address index that was latched by latch 510. The input to the latch 510 is the address mux output 508. Therefore, the address mux output is provided as a second input 512 of the address mux 504 during the next clock cycle. The address mux 504 is controlled by the read/qualify/write logic 534 through a control line 538. The control line 538 is connected to a latch 562 prior to connection with the address mux 504. The tag address index contained in the address mux output 508 and the candidate status contained in the status mux output 520 are sent to the L3 Sub-Array 514. The L3 Sub-Array 514 is partitioned into several tag array indexes. In one embodiment, the L3 Sub-Array 514 is partitioned into 2048 tag array indexes. The L3 Sub-Array 514 reads the tag address and status stored in the tag array at the tag array index specified by the address mux output 508. Receiving a transaction and processing through the reading of the tag address and status bits are accomplished during a single clock cycle. The L3 Sub-Array 514 is divided into the tag array 516 and the status array 518.

The stored tag address and the stored tag address status are sent from the L3 Sub-Array 514 in tag output 552 and status output 556 respectively. The tag output 552 is provided to a sense amp 544 which then provides the output 526 to comparator 530. The status output 556 is provided to a sense amp 548 which provides output 528 to the read/qualify/write logic 534 and the hit logic 542. The comparator 530 compares the stored tag address provided through line 526 with the received tag address which is latched by latch 510 and sent through line 564 to the comparator 530. If the received tag address and the stored tag address match, then a tag hit is reported through line 532 to the hit logic. If the stored status is shared, exclusive, or modified as reported in line 528, then the hit logic determines that a way hit has been met because a tag hit and a stored status of shared, exclusive or modified is met.

The read/qualify/write logic 534 uses the tag hit way 0 532 and determines if the stored status needs to be updated. The external logic 500 provides output 560 to the read/qualify/write logic which is used to determine if the stored status should be updated. If the stored status is a particular value, meeting the qualifications from the external logic 500, (one of shared, exclusive, or modified) and a tag hit has been obtained, then the read/qualify/write logic 534 enables the write driver 550 through write enable 538 to store the candidate status provided through output 520 in the status array 518 of the L3 Sub-Array 514. The output of the write driver 550 is provided through lines 558 to the status array 518. A write driver 546 is connected to the tag array 516 of the L3 Sub-Array 514. Output lines 554 connect the write driver 546 to the tag array 516. If a tag hit is met and the stored status meets the qualifications from external logic 500, then a way busy signal 538 is provided. If the tag addresses match and the status update is needed, then the read/qualify/write logic 534 outputs a way busy signal 538, and sends control signals 538 to the address mux 504, and the L3 Sub-Array 514. The control signal 538 selects the second input 512 of the address mux 504. A write enable signal 538 is transmitted from the read/qualify/write logic 534 to the L3 Sub-Array 514 through the write driver 550. Therefore, the previous tag array index is output from the address mux 504 as the address mux output 508 and the previous candidate status is output from the status mux 506 through the status mux output 520. The status is then written in the L3 Sub-Array 514 at the tag array index identified in the address mux output 508 with the status mux output 520. The writing to the L3 Sub-Array is completed within a single clock cycle.

The foregoing disclosure and description of the invention are illustrative and explanatory thereof and various size, shape, materials, and components may be made without departing from the spirit of the invention.

What is claimed is:

1. An apparatus for performing transactions in a single ported cache memory, including a cache directory partitioned into ways containing tag addresses, the apparatus comprising:
   a cache controller coupled to the cache memory;
   the cache directory portion partitioned into ways containing tag addresses and tag address statuses; and
   the cache controller performing the steps of:
     receiving first and second transactions, the transactions containing respective tag addresses and candidate statuses;
     reading all the ways for the first transaction during a first clock cycle, wherein the reading includes comparing the received tag addresses for the first transaction to tag addresses stored in the ways and the stored tag address statuses to a predetermined value during a first clock cycle; and
     reading for the second transaction, during a second clock cycle, solely the ways that are not being updated for the first transaction, while also updating, during the second clock cycle, one of the ways that contains a matching stored tag address and tag address status for the first transaction.

2. The apparatus of claim 1, wherein the step of receiving a transaction includes: receiving a read/qualify/write transaction.

3. The apparatus of claim 1 wherein the step of receiving the transaction includes story the received tag address and previously received candidate status in a latch.

4. The apparatus of claim 2 wherein the step of updating includes steering the multiplexer to allow the previously received tag address and status candidate to be written to a way.

5. The apparatus of claim 2 wherein the predetermined set of statuses include MESI statuses.

6. The apparatus of claim 5, wherein the MESI statuses include a shared status.

7. The apparatus of claim 5, wherein the MESI statuses include an exclusive status.

8. The apparatus of claim 5, wherein the MESI statuses include a modified status.

9. The apparatus of claim 5, wherein the MESI statuses include a invalid status.

10. An apparatus for the performing transactions in a cache memory comprising:
    a cache controller coupled to the cache memory;
    the cache memory comprising a cache directory portion partitioned into ways and sets; and
    the cache controller performing the steps of:
      receiving at least two transactions separated by at least one clock cycle;
      reading all ways in a set;
      comparing a tag address of the first transaction with tag addresses stored in the ways read;
      comparing stored tag address statuses with a predetermined value;
      updating a way containing a matching stored tag address and tag address status while simultaneously reading all ways that are not being updated;
      comparing the received tag addresses of the second transaction with the tag addresses stored in the ways read;
      comparing the store tag address statuses with a predetermined value;
      if the addresses of the second transaction match the addresses of the ways read and the statuses match, updating each way containing the matched stored tag address; and
      if the addresses of the second transaction do not match the stored tag addresses in the ways read and one way is busy, rereading all ways to assure that the second received tag address has been compared with each possible stored tag address.

11. The apparatus of claim 10 wherein the step of receiving a transaction includes steering the previously received tag address and previously received candidate tag address status in a latch.

12. The apparatus of claim 10 wherein the step of updating includes steering the multiplexer to allow the previously received tag address and candidate status to be written to a way.

13. A method for performing concurrent reads of multiple ways in a set while performing a write to a single way, each way containing a tag address and a status, the method comprising the steps of:
    receiving a transaction, the transaction including an address and a candidate status;
    reading all ways in the set;
    comparing the address of the transaction to the stored tag address in each way;
    comparing the stored status with a predetermined value;
    if the received address and status match a stored tag address and status, performing an update of the stored tag address status in that way;
    receiving a second transaction, the second transaction including a second address and second status;
    during the updating of the tag address status, reading the remaining ways in the set;

comparing the second address to the tag addresses of the ways read;

comparing the second stored status to a predetermined value;

if the second address and status match a stored tag address and status, performing an update of the stored tag address in that way; and if the second address and status do not match a stored tag address and status, rereading all ways upon the completion of the updating of the stored tag address status in the busy way.

14. The method of claim 13, wherein the step of receiving a transaction includes receiving a read/qualify/write transaction.

15. The method of claim 13 wherein the step of receiving includes steering the previously received tag address status and previously received tag address in a latch.

16. The method of claim 13 wherein the step of updating includes steering the multiplexer to allow the previously received tag address status to be written to a way.

* * * * *